US011321512B2

(12) United States Patent
Krieg et al.

(10) Patent No.: US 11,321,512 B2
(45) Date of Patent: May 3, 2022

(54) METHOD FOR AUTOMATIC DETECTION OF A FUNCTIONAL PRIMITIVE IN A MODEL OF A HARDWARE SYSTEM

(71) Applicant: Technische Universität Wien, Vienna (AT)

(72) Inventors: Christian Krieg, Vienna (AT); Axel Jantsch, Vienna (AT); Martin Mosbeck, Vienna (AT)

(73) Assignee: Technische Universität Wien, Vienna (AT)

( * ) Notice: Subject to any disclaimer, the term of this patent is extended or adjusted under 35 U.S.C. 154(b) by 259 days.

(21) Appl. No.: 16/499,371

(22) PCT Filed: Mar. 29, 2018

(86) PCT No.: PCT/EP2018/000137
§ 371 (c)(1),
(2) Date: Sep. 30, 2019

(87) PCT Pub. No.: WO2018/177598
PCT Pub. Date: Oct. 4, 2018

(65) Prior Publication Data
US 2020/0042662 A1 Feb. 6, 2020

(30) Foreign Application Priority Data

Mar. 30, 2017 (EP) ..................... 17163776

(51) Int. Cl.
*G06F 30/33* (2020.01)
*G01R 31/3183* (2006.01)
*G06F 111/04* (2020.01)

(52) U.S. Cl.
CPC ..... *G06F 30/33* (2020.01); *G01R 31/318357* (2013.01); *G06F 2111/04* (2020.01)

(58) Field of Classification Search
CPC ...... G06F 30/34; G06F 30/33; G06F 30/3323; G06F 30/30; G06F 2111/04; G01R 31/318357
See application file for complete search history.

(56) References Cited

U.S. PATENT DOCUMENTS 6,728,945 B1* 4/2004 Wang .................. G06F 30/33
716/103
7,350,180 B1* 3/2008 Slavin .................. G06F 30/30
716/103

(Continued)

OTHER PUBLICATIONS

International Preliminary Report on Patentability issued in Application No. PCT/EP2018/000137 dated Oct. 1, 2019, 7 pages.

(Continued)

*Primary Examiner* — Kibrom K Gebresilassie
(74) *Attorney, Agent, or Firm* — Fiala & Weaver P.L.L.C.

(57) ABSTRACT

A method for automatic detection of a functional primitive in a model of a hardware system, the model being a netlist having cells and net links therebetween, comprising the steps:
  a) mapping the cells to target nodes, each of which having a target node type, and the net links to edges of a target graph, and mapping the functional primitive to a search pattern having search nodes and connections therebetween;
  b) selecting candidates from those target nodes the target node types of which match a search node type, and selecting a candidate structure from those selected candidates the target nodes and edges of which match the search nodes and connections of the search pattern;
  c) reverse-mapping the target nodes and edges of the selected candidate structure to the cells and net links of the netlist; and
  d) outputting said cells and net links as detected functional primitive.

5 Claims, 8 Drawing Sheets

(56) References Cited

U.S. PATENT DOCUMENTS

| | | | | |
|---|---|---|---|---|
| 7,523,423 | B1* | 4/2009 | Koelbl | G06F 30/3323 716/103 |
| 8,443,344 | B1* | 5/2013 | Sundararajan | G06F 30/34 717/137 |
| 2002/0194393 | A1* | 12/2002 | Hrischuk | G06F 9/542 719/318 |
| 2007/0061124 | A1* | 3/2007 | Van Huben | G06F 30/33 703/16 |
| 2008/0288916 | A1* | 11/2008 | Tazoe | G06F 8/34 717/105 |
| 2009/0119484 | A1* | 5/2009 | Mohl | G06F 30/34 712/201 |
| 2010/0325593 | A1* | 12/2010 | Zavadsky | G06F 30/33 716/104 |
| 2013/0055179 | A1* | 2/2013 | Fan | G06F 30/33 716/106 |
| 2015/0067626 | A1* | 3/2015 | Chen | G06F 30/36 716/111 |
| 2019/0050512 | A1* | 2/2019 | Grau | G06F 9/4887 |
| 2020/0042662 | A1* | 2/2020 | Krieg | G01R 31/318357 |
| 2021/0117232 | A1* | 4/2021 | Sriharsha | G06F 16/285 |

OTHER PUBLICATIONS

The extended European Search Report issued in Application No. 17163776.2 dated Oct. 2, 2017, 9 pages.

International Search Report and Written Opinion issued in Application No. PCT/EP2018/000137 dated Jul. 24, 2018, 10 pages.

Gascon, Adria et al., "Template-based circuit understanding", 2014 Formal Methods in Computer-Aided Design (FMCAD), FMCAD and Authors, Oct. 21, 2014, XP032709952, pp. 83-90.

Hamza, Bouchaour et al., "Towards a method for VLSI circuit reverse engineering", Proceedings of the Third International Conference on Computer Science and its Application (CIIA'11), Dec. 13, 2011, Saida, Algeria, XP055144824, 5 pages.

Soeken, Mathias et al., "Simulation Graphs for Reverse Engineering", 2015 Formal Methods in Computer-Aided Design (FMCAD), FMCAD Inc, Sep. 27, 2015, XP032945205, pp. 152-159.

Dutertre, Bruno, "Yices Manual Version 2.5", SRI International, Jul. 28, 2016, Computer Science Laboratory, 79 pages.

Li, Wenchao et al., "Reverse Engineering Circuits Using Behavioral Pattern Mining", 2012 IEEE, 6 pages.

Li, Wenchao et al., "WordRev: Finding Word-Level Structures in a Sea of Bit-Level Gates", 2013 IEEE, 8 pages.

Subramanyan, Pramod et al., "Reverse Engineering Digital Circuits Using Structural and Functional Analyses", 2013 IEEE, IEEE Transactions on Emerging Topics in Computing, 18 pages.

Tashjian, Edward et al., "On Using Control Signals for Word-Level Identification in a Gate-Level Netlist", Department of Electrical Engineering, University of Wisconsin at Madison, DAC'15, Jun. 7-11, 2015, 6 pages.

Wolf, Clifford et al., "Yosys—A Free Verilog Synthesis Suite", Johannes Kepler University, Austria, Institute for Integrated Circuits, Yosys—austrochip2013, 6 pages.

Yu, Cunxi et al., "Automatic Word-level Abstraction of Datapath", 2016 IEEE, 4 pages.

\* cited by examiner

```verilog
module lfsr (
        input clk,
        output [7:0] lfsr_1,
        output [7:0] lfsr_2,
);

// LFSRs
        reg [7:0] lfsr_1 = 2;
        reg [7:0] lfsr_2 = 2;

// First implementation of LFSR
        always @(posedge clk) begin
                lfsr_1 <= {lfsr_1, lfsr_1[2] ^ lfsr_1
                    [4] ^ lfsr_1[7]};
        end // Second implementation of LFSR
        wire feedback;
        assign feedback = lfsr_2[2] ^ lfsr_2[4] ^
            lfsr_2[7];

always @(posedge clk) begin
                lfsr_2 <= {lfsr_2[6], lfsr_2[5], lfsr_2
                    [4], lfsr_2[3], lfsr_2[2], lfsr_2
                    [1], lfsr_2[0], feedback};
        end
endmodule
```

*Fig. 1a*

*(State of the Art)*

*Fig. 1b*

*(State of the Art)*

| | Grouping |
|---|---|
| ( | Block begin |
| ) | Block end |
| [ [ | Loop begin |
| ] ] | Loop end |
| | Outer Connections |
| -- | Undirected serial connection |
| -> | Directed serial connection, left to right |
| <- | Directed serial connection, right to left |
| \| \| | Parallel connection |
| | Inner connections |
| - | Undirected |
| > | Directed, left to right |
| < | Directed, right to left |
| \| | Parallel |
| | Quantification |
| {n} | Match exactly $n$ times |
| {n,} | Match at least $n$ times |
| {n,m} | Match from $n$ to $m$ times |
| # | Match even number of times |
| ~ | Match odd number of times |
| + | Match one or more times |
| * | Match zero or more times |
| ? | Match zero or one time |

```
⟨pattern⟩ ::= ⟨opt_p_label⟩ ⟨expression_list⟩
    ⟨opt_property_list⟩ ';'

⟨property_list⟩ ::= ⟨property⟩
  | ⟨property_list⟩ ',' ⟨property⟩

⟨opt_property_list⟩ ::= ⟨empty⟩ | ⟨property_list⟩

⟨expression_list⟩ ::= ⟨opt_sp_label⟩ ⟨expression⟩
  | ⟨expression_list⟩ ',' ⟨opt_sp_label⟩ ⟨expression⟩

⟨expression⟩ ::= ⟨NODE_IDENTIFIER⟩ ⟨opt_quantification⟩
    ⟨opt_e_label⟩
  | '(' ⟨expression⟩ ')' ⟨opt_quantification⟩ ⟨opt_e_label⟩
  | '[[' expression ']]' ⟨opt_quantification⟩ ⟨opt_e_label⟩
  | ⟨expression⟩ '--' ⟨expression⟩
  | ⟨expression⟩ '->' ⟨expression⟩
  | ⟨expression⟩ '<-' ⟨expression⟩
  | ⟨expression⟩ '||' ⟨expression⟩
  | ⟨e_label⟩

⟨quantifier⟩ ::= '#' | '~' | '+' | '*'

⟨inner_connector⟩ ::= '-' | '>' | '<' | '|'

⟨opt_quantification⟩ ::= ⟨empty⟩ | ⟨quantification⟩

⟨quantification⟩ ::= '?'
  | ⟨inner_connector⟩ ⟨quantifier⟩
  | ⟨inner_connector⟩ '{' ⟨UNSIGNED⟩ ',' ⟨UNSIGNED⟩ '}'
  | ⟨inner_connector⟩ '{' ⟨UNSIGNED⟩ '}'
  | ⟨inner_connector⟩ '{' ⟨UNSIGNED⟩ ',' '}'

⟨opt_e_label⟩ ::= ⟨empty⟩ | ⟨e_label⟩

⟨e_label⟩ ::= ':' ⟨STRING⟩

⟨opt_sp_label⟩ ::= ⟨empty⟩ | ⟨sp_label⟩

⟨sp_label⟩ ::= ⟨STRING⟩ ':'

⟨opt_p_label⟩ ::= ⟨empty⟩ | ⟨p_label⟩

⟨p_label⟩ ::= ⟨STRING⟩ '='

⟨NODE_IDENTIFIER⟩ ::= ( '$' | '\' ) ⟨STRING⟩

⟨STRING⟩ ::= [a-zA-Z_0-9]+

⟨UNSIGNED⟩ ::= [0-9]+
```

[[$dff->($xor>+)|+]]

*Fig. 6a*

| ID | Category | Contents |
|---|---|---|
| 1 | Single | $dff |
| 2 | Single | $xor |
| 3 | Quantified | ...>+ |
| 4 | Quantified | ...|+ |

|   | 1 | 2 | 3 | 4 |
|---|---|---|---|---|
| 1 |   |   |   | 1 |
| 2 |   |   |   |   |
| 3 |   |   |   |   |
| 4 | 1 |   |   |   |

*Fig. 6d*

|   | 1 | 2 | 3 | 4 |
|---|---|---|---|---|
| 1 |   |   |   |   |
| 2 |   |   |   |   |
| 3 |   |   |   |   |
| 4 |   |   |   |   |

ID = 3
Quantification: '>+'
Containing:
  Single = {2}
  Quantified = {}

*Fig. 6e*

|   | 1 | 2 | 3 | 4 |
|---|---|---|---|---|
| 1 |   |   |   |   |
| 2 |   |   |   |   |
| 3 |   |   |   |   |
| 4 |   |   |   |   |

ID = 4
Quantification: '|+'
Containing:
  Single = {}
  Quantified = {3}

METHOD FOR AUTOMATIC DETECTION OF A FUNCTIONAL PRIMITIVE IN A MODEL OF A HARDWARE SYSTEM

CROSS-REFERENCE TO RELATED APPLICATIONS

This application is a National Phase application of International Application No. PCT/EP2018/000137, filed Mar. 29, 2018, which claims priority to European Patent Application No. 17 163 776.2, filed Mar. 30, 2017, the disclosures of which are hereby incorporated by reference in their entirety.

FIELD

The present subject matter relates to a method for automatic detection of a functional primitive in a model of a hardware system.

BACKGROUND

Investigating, understanding and reverse-engineering hardware designs has attracted the interest of research and industry in the past years. Hardware systems are commonly described in hardware description language (HDL), such as VHDL or Verilog. However, the problem of directly searching HDL descriptions is that the same functionality can be described in arbitrary fashion, using different coding styles.

Figure 1A:
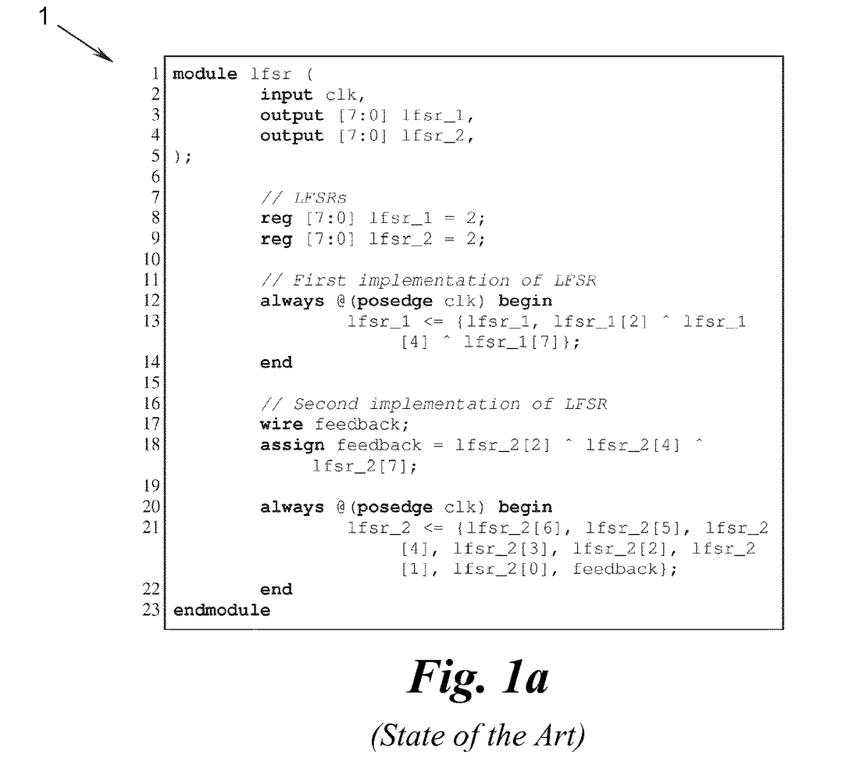
FIGS. 1a and 1b show a model of an 8-bit linear-feedback shift register (LFSR) described in a hardware description language in differently coded styles (FIG. 1a) and as a netlist (FIG. 1b), both according to the state of the art.

To give an example for different coding styles, an HDL listing 1 in FIG. 1a shows different implementations of two functionally equivalent 8-bit linear-feedback shift registers (LFSRs) in Verilog: an exemplary first implementation in lines 12 to 14 and a very different, nevertheless functionally equivalent alternative second implementation in lines 17 to 22 of listing 1 in FIG. 1a. Nevertheless, LFSRs share the common feature that the output for the next clock cycle is a function of the current clock cycle's register bit values combined by XOR operations. Due to the freedom in coding, and exponential complexity in the operands' number of combination options, it is practically unfeasible to directly search HDL descriptions to automatically detect functional primitives such as those LFSRs.

At present, the focus in the field of hardware investigation is drawn on extracting word-level structures from netlists, typically bit-level netlists at gate-level. Generally, a netlist is a specification of (electronic) components and how they are connected together and can be synthesised of an HDL description. E.g., W. Li et al., "Reverse engineering circuits using behavioural pattern mining", 2012 IEEE International Symposium on Hardware-Oriented Security and Trust (2012), pp. 83-88, present an approach to reverse-engineer the high-level description of a design from its gate-level representation. The authors derive behavioural patterns from the simulation traces of a design (the "haystack") as well as for library components (the "needles"), create a pattern graph from both and perform subgraph isomorphism to find the needles in the haystack. Likewise, W. Li et al., "WordRev: Finding word-level structures in a sea of bit-level gates", 2013 IEEE International Symposium on Hardware-Oriented Security and Trust—HOST (2013), pp. 67-74, extract word-level structures from bit-level structures in gate-level netlists.

Figure 1B:
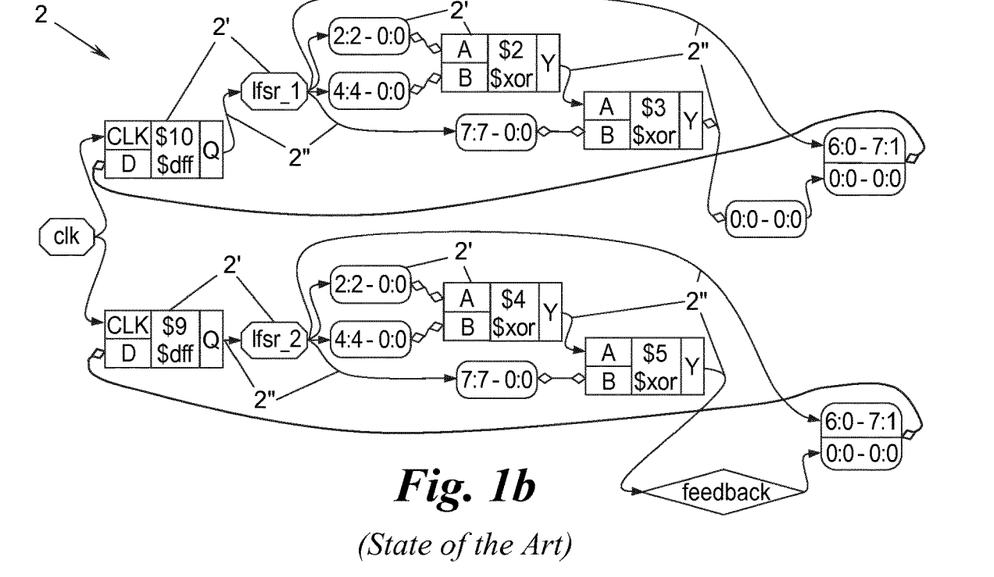

FIG. 1b shows a netlist 2 at a higher level of abstraction, i.e. at register transfer level (RTL), representing the two LFSRs listed in FIG. 1a. This netlist 2 has cells 2' and net links 2" for data flow therebetween; it was generated using an RTL intermediate language (RTLIL) introduced by C. Wolf in "Yosys Manual", cf. C. Wolf et al., "Yosys—A Free Verilog Synthesis Suite", Proceedings of Austrochip, 2013. As RTLIL is a high-level netlist representation, it eliminates the discrepancies introduced by different coding styles. Despite the differences in coding of the LFSRs in listing 1 of FIG. 1a, their representations in netlist 2 (top and bottom) of FIG. 1b are structurally equivalent.

However, netlist representations still carry details leading to an unnecessary diversity. This diversity has to be matched when defining search patterns representing the functional primitive to be detected, resulting in a plurality of search patterns to be defined even for detecting a single functional primitive and in an extensive search, both impeding the automatic detection of the functional primitive. Moreover, when a specific variation of the functional primitive's diversity is not included in the search pattern definition, this variation and consequently an occurrence of the functional primitive will not be detected.

P. Subramanyan et al., "Reverse Engineering Digital Circuits Using Structural and Functional Analyses", IEEE Transactions on Emerging Topics in Computing 2.1 (2014), pp. 63-80, propose an algorithmic approach to detect functional primitives in a design specification. This means that for each functional primitive, a separate algorithm has to be developed that searches for the respective functional primitive.

A. Gascón et al., "Template-based Circuit Understanding", Proceedings of the 14th Conference on Formal Methods in Computer-Aided Design, FMCAD '14, Lausanne, Switzerland, FMCAD Inc (2014), 17:83-17:90, present a template-based approach to find functional primitives such as counters, shift registers, or arithmetic logical units (ALUs). Their approach aims to reverse-engineer the high-level description of a gate-level netlist. Templates are formulated using the Yices language, see B. Dutertre, "Yicese Manual", Jul. 28, 2016. However, the templates are not agnostic to the bit width of functional primitives.

M. Soeken et al., "Simulation Graphs for Reverse Engineering", Proceedings of the 15th Conference on Formal Methods in Computer-Aided Design, FMCAD '15, Austin, Tex., FMCAD Inc (2015), pp. 152-159, target the reverse-engineering problem by the concept of simulation graphs. Simulation graphs capture simulation behaviour of library components ("needles") and a flat design ("haystack") at gate-level. The approach aims at finding circuit behaviour. However, simulation can never be exhaustive.

E. Tashjian et al., "On Using Control Signals for Word-level Identification in a Gate-level Netlist", Proceedings of the 52nd Annual Design Automation Conference, DAC '15, San Francisco, Calif., ACM (2015), 78:1-78:6, identify groups of words by analyzing proximity of nets in get-level netlist files to create a word-level abstraction.

C. Yu et al., "Automatic word-level abstraction of datapath", 2016 IEEE International Symposium on Circuits and Systems (ISCAS) (2016), pp. 1718-1721, propose a technique based on algebraic rewriting to create a word-level abstraction of a gate-level netlist.

SUMMARY

It is an object of the disclosed subject matter to provide a method for automatic detection of a functional primitive in a model of a hardware system which is reliable, efficient and feasibly applicable also to large models.

This object is achieved with a method for automatic detection of a functional primitive in a model of a hardware system, the model being a netlist at register transfer level, the netlist having cells and net links therebetween and being bipartite regarding its cells and net links, comprising the following steps:

a) mapping the cells to nodes and the net links to edges of a target graph which is monopartite and each target node of which has a target node type, and mapping the functional primitive to a hierarchical search pattern having at least two levels of search nodes and connections therebetween, wherein each search node either is a single node having a search node type or is a container node containing at least one further search node of a lower level, a multiplier indicating a multiplicity of said at least one further search node, and a connection type indicating a type of the connections between the search nodes of said multiplicity;

b) selecting candidates from those target nodes the target node types of which match a search node type, and selecting a candidate structure from those selected candidates the target nodes and edges of which match the search nodes and connections of the search pattern;

c) reverse-mapping the target nodes and edges of the selected candidate structure to the cells and net links of the netlist; and d) outputting said cells and net links as detected functional primitive.

Mapping the netlist representation of the hardware system to said target graph can easily and efficiently be done even for extensive netlists. Thereby, unnecessary details of the netlist are avoided. Hence, the target graph (herein also called "design graph" or "target design") is an abstraction of the netlist.

To model the variability still remaining in the target graph representation said hierarchical search pattern to which the functional primitive is mapped is further abstracted. The search pattern (herein also simply called "pattern") is phrased in a pattern graph specification language (PGSL) the structure and grammar of which is detailed further down. Thus, a single search pattern suffices to detect a functional primitive irrespective of coding styles and parameters due to the hierarchical structure of the search pattern with search nodes (herein also called "pattern nodes") which can be single nodes or container nodes (herein also called "quantified nodes") and the provision for search node type (herein also called "pattern node type"), multiplier (herein also called "quantifier")—indicating the multiplicity (herein also called "quantification")—and connection types, respectively.

The present method is particularly efficient both in search pattern generation and in detecting the functional primitive, as it focuses on selected candidates, thereby disregarding all target nodes of irrelevant target node types ("unneeded types"), and on selected candidate structures, i.e. structures of candidates which match the search pattern, while discarding non-matching structures.

In an optional embodiment, step b) comprises:

b1) starting at the highest level of the search pattern as present level;

b2) determining whether the search pattern of the present level contains at least one single node, and if so, performing said selecting of candidates from those target nodes the target node types of which match a search node type of said at least one single node;

b3) determining whether the search pattern of the present level contains at least one container node and no candidate has been selected for single nodes contained in said container node and, if so, proceeding to step b4), otherwise, performing said selecting of a candidate structure from those selected candidates the target nodes and edges of which match the search nodes of the present level and their connections, and proceeding to step b5);

b4) setting the present level a level lower and returning to step b2);

b5) determining whether the present level is not the highest level, and if so, setting the present level a level higher and proceeding to step b3), otherwise, proceeding to step c).

Thereby, the selecting of step b) is conducted in a recursive manner making the method particularly efficient. The candidates of the target graph are searched and combined to matching candidate structures by stepping through the hierarchical structure of the search pattern step-by-step; whenever a candidate structure does not match at any step of the recursion it is immediately eliminated from all further steps.

In this embodiment, it is particularly economic when prior to step b2) the target graph is filtered by masking out those target nodes the target node type of which does not match the search node type of any search node. Hence, only target nodes which possibly contribute to the detection of the functional primitive are considered. Depending on the search pattern and the search node types thereof, such filtering can substantially reduce the number of target nodes to be considered in step b2).

For an even more efficient implementation of the selecting step, it is advantageous when, for selecting candidates and a candidate structure, the search pattern is parsed into a search node map and a search graph, the search node map containing a unique search node identifier for each of the search nodes, the respective search node type for each single node, and both the respective connection type and multiplier for each container node, and the search graph containing the respective search node identifiers of the search nodes of each level and their mutual adjacencies. The search graph (herein also called "pattern graph") suffices during selecting candidates and filtering the target graph, thereby accelerating these steps. Also when selecting a candidate structure, the separation of the search pattern into the search node map (herein also called "pattern node map") and search graph saves significant processing power, while the parsing itself is not very power consuming. The search node identifiers (herein also called "pattern node identifiers") permanently correlates search node map and search graph in a simple, efficient manner.

Favourably, said selecting of candidates further comprises that the target node types of adjacent target nodes have to match search node types of adjacent search nodes. This criterion can easily be deployed. Specifically when having a large target graph, the additional criterion prevents selecting an excess of candidates.

In a further optional embodiment, said selecting of a candidate structure comprises solving a constraint satisfaction problem the constraints of which include the connection types of the search nodes, and wherein the candidate structure is selected from those candidates, the edges of which satisfy the constraints. A constraint satisfaction problem can easily be formulated and computer-aided solvers are widely known and available. Moreover, solving a constraint satisfaction problem is an efficient way of selecting candidate structures as it is open for different and even multiple constraints.

BRIEF DESCRIPTION OF THE DRAWINGS/FIGURES

The disclosed subject matter will now be described in further detail by means of exemplary embodiments thereof under reference to the enclosed drawing in which.

DETAILED DESCRIPTION

Based on the FIGS. 1 to 8, a search methodology to find substructures in netlists in order to understand hardware designs at higher levels of abstraction, particularly at register transfer level (RTL), is described. The methodology targets structural identification and includes a graph data model, a pattern specification language and a search algorithm to find subgraph isomorphisms. Example applications of the methodology are automatic property extraction, high-level module generation, or statistical analysis of hardware designs.

Regarding FIGS. 1a and 1b it is referred to the introductory part herein.

Figure 2A:
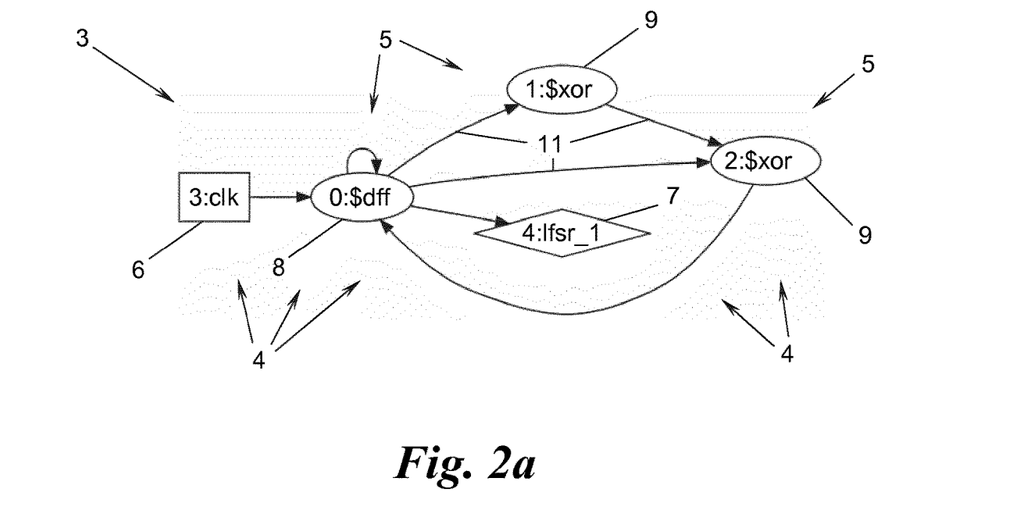
FIGS. 2a and 2b depict target graphs according to the disclosed subject matter representing the 8-bit LFSR of FIGS. 1a and 1b (FIG. 2a) and a 32-bit LFSR (FIG. 2b)

FIG. 2a shows an exemplary target graph 3 representing both 8-bit LFSRs of the netlist 2 shown in FIG. 1b. The target nodes (herein also called "design graph nodes") 4 in a target graph 3 may be cell nodes 5, primary input (PI) nodes 6, primary output (PO) nodes 7, or const nodes (representing constant values, not shown in FIG. 2a). In the example of FIG. 2a the cell nodes 5 are of two different target node types (herein also called "design node types"), a register node 8 and two XOR-nodes 9.

Figure 2B:
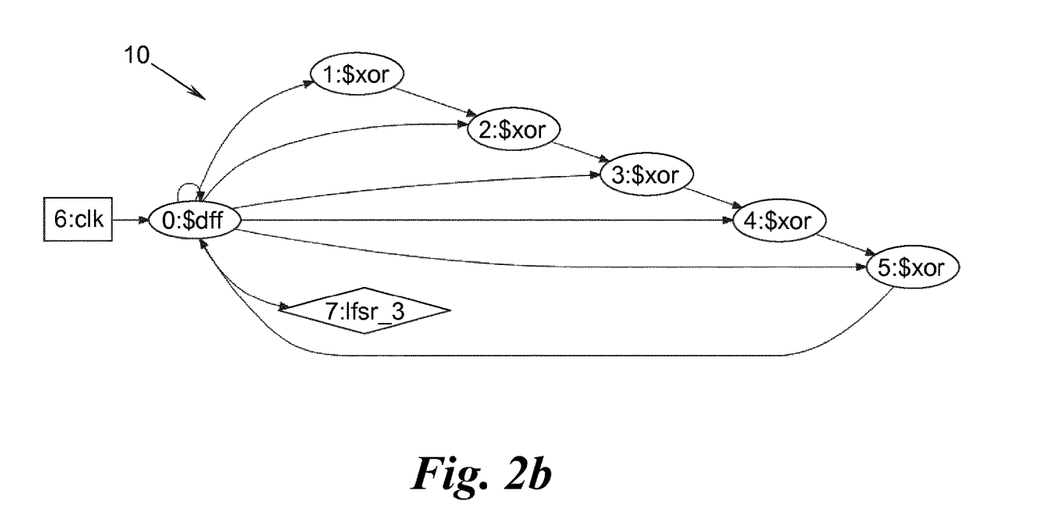

By abstracting the target graph, the common feature of LFSRs—that the output for the next clock cycle is a function of the current clock cycle's register bit values combined by XOR operations—is immediately visible. However, while FIG. 2a shows the target graph 3 of the 8-bit LFSRs of FIGS. 1a and 1b, an exemplary target graph 10 of a 32-bit LFRS as shown in FIG. 2b is of different structure. Both target graphs 3 and 10 of FIGS. 2a and 2b, respectively, have a shift register with XOR operations on its feedback path. Nevertheless, the target graphs 3 and 10 of the FIGS. 2a and 2b also illustrate the challenge in describing the common feature of functional primitives such as LFSRs. When, e.g., an LFSR of whatever bit-length shall be detected, the definition of a search pattern is not trivial.

The search pattern specification language allows to specify substructures comparable to regular expressions, that implement similar functionality (e.g., counter, LFSR), but with different parameter valuation (register width, feedback paths) as will be explained in detail further down in reference to FIGS. 3 to 6. In general, it allows to create structural invariants from classes of functional primitives.

In order to find functional primitives from electronic designs, the concept of the structural kernel is introduced. For example, the structural kernel of a counter is a register in which the counter value is stored, and an adder that increments the counter value. The structural kernel of an LFSR is a register, and one or more XOR cells in its feedback path(s).

Besides the structural kernel, additional circuitry may extend the core functionality of the functional primitive. For a counter, this could be, for example: synchronous reset, preload, up/down controller, etc.

To counter the problem of coding style dependency in HDL, the RTL intermediate language (RTLIL) representation of a design—introduced by C. Wolf in "Yosys Manual", cf. C. Wolf et al, "Yosys—A Free Verilog Synthesis Suite", Proceedings of Austrochip, 2013—is used. In the free and open-source synthesis tool Yosys, RTLIL is the internal representation of the design at RTL. As RTLIL is a high-level netlist representation, it eliminates the discrepancies introduced by different coding styles. In RTLIL, the two LFSR implementations given in listing 1 are structurally equivalent. FIG. 1b shows the graphical netlist 2 produced by Yosys.

The netlist representation still carries unnecessary detail for the goal to find substructures in it. Therefore, the design is further abstracted by mapping the bipartite netlist graph to a monopartite projection regarding the cells of the design. The resulting graph representation is called a design graph in the following. FIG. 2a shows design graph 3 of the LFSRs specified in Listing 1 and netlist 2, respectively. In the design graph 3, nodes 4 represent cells 2' and edges 11 represent data flow net links 2" between the cells 2'. A design graph 3, 10 has cell nodes 5, primary input (PI) nodes 6, primary output (PO) nodes 7, and const nodes (not shown in the example of FIG. 2a) as well as edges 11 connecting the nodes. The labels of cell nodes in a design graph are a unique node ID and the cell type of the corresponding RTLIL cell.

Besides coding style, also structural variability determines the shape of a functional primitive. As already pointed out, for an LFSR this is the register width and the feedback path configuration. The design graph 10 of a 32-bit LFSR is illustrated in FIG. 2b. Compared to FIG. 2a, FIG. 2b perfectly illustrates the common feature of LFSRs, i.e., a shift register with XOR operations on its feedback path. The main challenge is to find a way to describe the common feature of functional primitives such as LFSRs.

To solve the problem of structural variability a pattern graph specification language (PGSL, speak: pixel) is introduced that allows to model variabilities. With PGSL it is possible to define structural primitives as graphs with quantified subgraphs. Similar to the known dot language, "The DOT Language", url:www.graphviz.org/content/dot-language (visited on Nov. 30, 2016), PGSL defines directed and undirected edges between nodes. In addition, PGSL allows to specify parallel edges and cycles (feedback edges). The connectivity between nodes and subgraphs is specified with so called connectors. Inspired by regular expressions, PGSL allows to quantify the occurrence of nodes and subgraphs in a sense of zero or one times, zero or more times, one or more times, and minimum N, maximum M times. Additionally, PGSL defines quantifiers for even and odd occurrence.

PGSL is used to specify pattern graphs (needles) which are then searched for in the design graph representation of an electronic design (haystack). A constraint satisfaction problem (CSP) solver is optionally used to find the subgraph isomorphisms.

Figure 3:
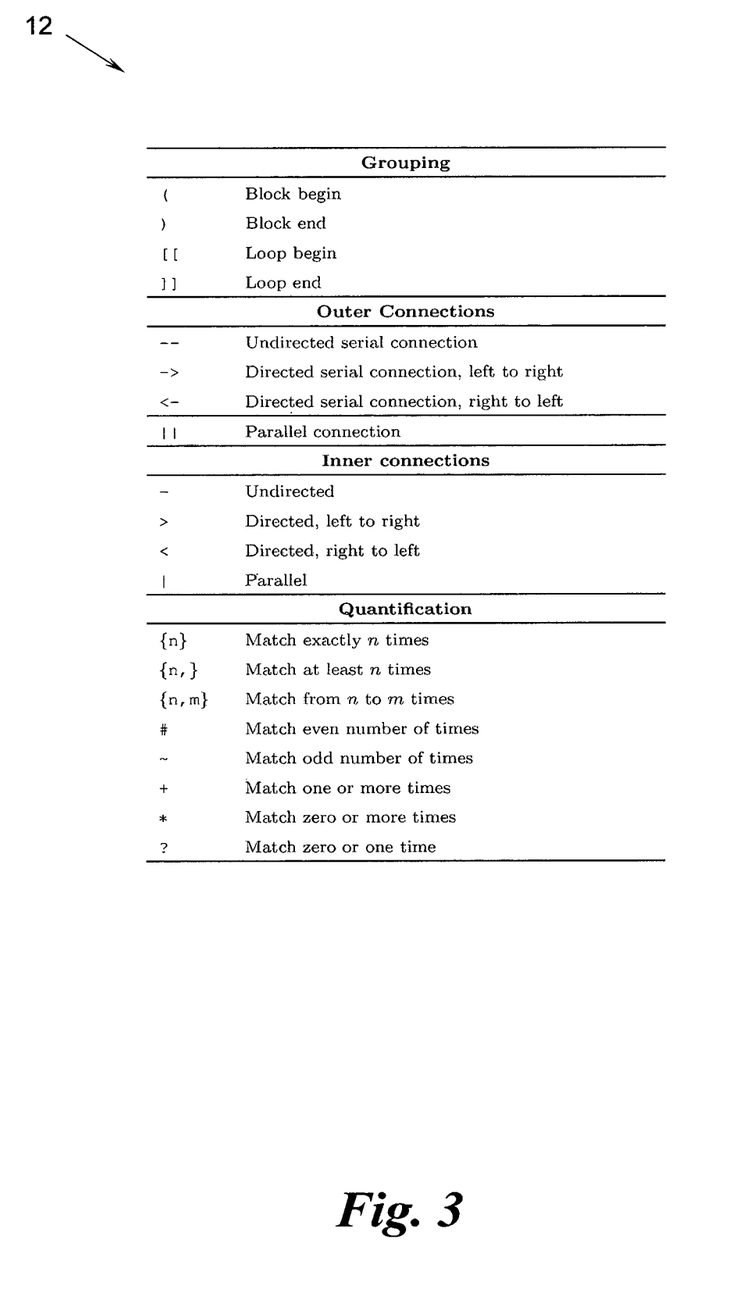
FIG. 3 shows a table of structural elements of a pattern graph specification language (PGSL) according to the disclosed subject matter.

The structural elements of PGSL shall be detailed in reference to table 12 of FIG. 3 in the following.

A pattern graph consists of blocks. The simplest form of a block is one single node representing an element to be found in the target design graph. Blocks can be grouped within the parentheses '(' and ')' to form new blocks. Blocks can be combined to a new block via outer connections. Another way to group blocks is using double brackets '[[' and ']]' which additionally adds a feedback connection. To tackle the problem of structural variability, the occurrence of blocks can be quantified.

Connecting two blocks can be seen as connecting two graphs. This means that a decision has to be made on how to connect the elements of the first block to the elements of the second block. Therefore, it is defined that each block has two sides to which connections can be made to or from. These sides are referred to as right and left and stored as two sets as right nodes and left nodes.

Connections between two blocks are referred to as outer connections, as they connect the "outer nodes" on the left side or the right side to right or left nodes of another block. There is an undirected version of outer connections ('- -'), and also two directed versions: left-to-right ('->') and right-to-left ('<-'). As the naming suggests, a right-to left connection connects nodes from the set of right nodes within a block to the set of left nodes within the other block and vice versa.

For covering parallel matching, a parallel outer connector ('||') is introduced. Blocks connected in parallel need a serially connected block on their left side (common branching block) or a block serially connected on their right side (common sink block), or both.

In order to match inexact structures (like regular expressions), several quantifiers are defined to express the number of occurrences of blocks. A quantified block consists of a block definition and a quantification. The block definition defines the structure of a stage of the quantified block. A quantification consists of two elements: a quantifier that specifies the limits of occurrence and an inner connector that details how the stages are connected to each other. Inner connections can take the form of undirected ('-'), left-to-right serial ('>'), right-to-left serial ('<') or parallel ('|').

The following quantifiers are defined: '{n}' (match exactly n times), '{n,}' (match at least n times), '{n,m}' (match from n to m times), '#' (match even number of times), '~' (match odd number of times), '+' (match one or more times), '*' (match zero or more times), '?' (match zero or one time).

Figure 4:
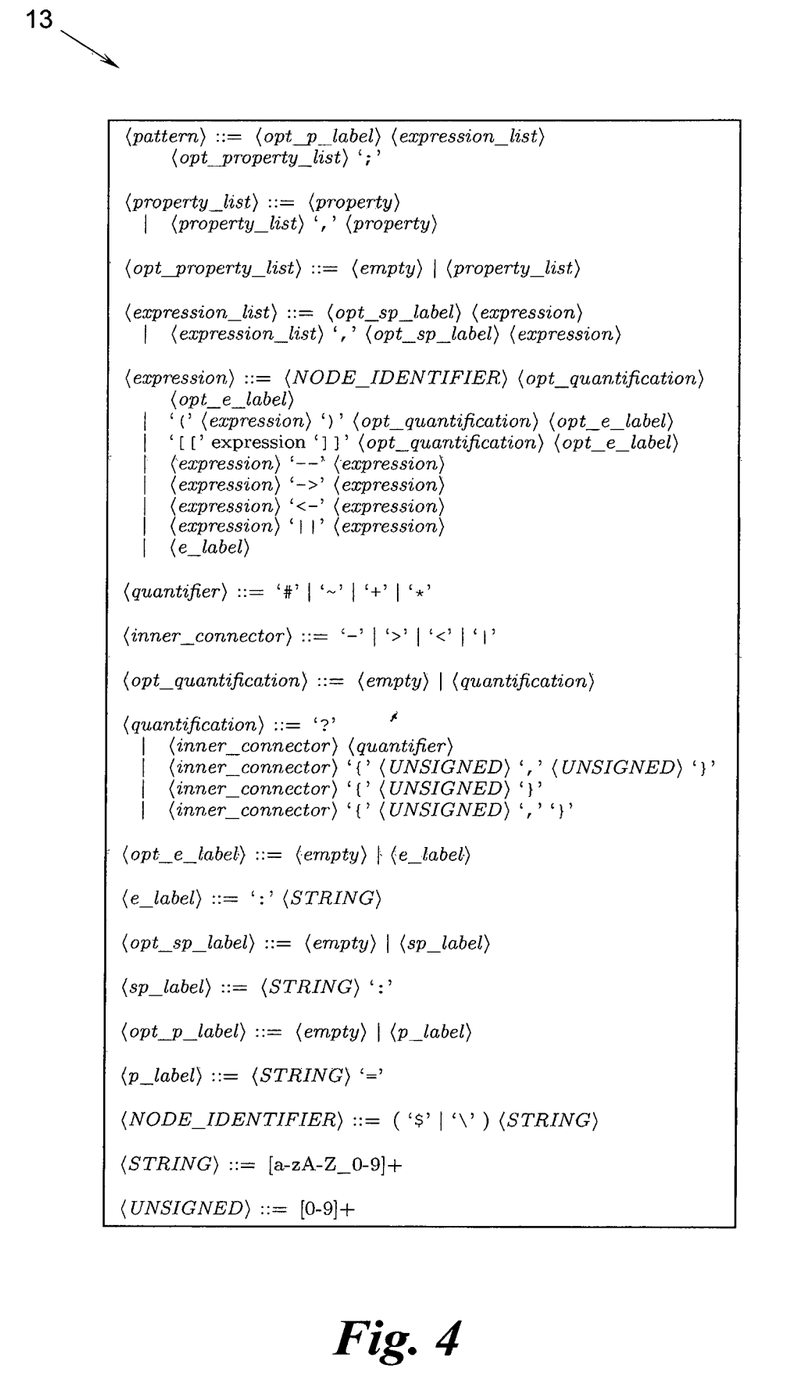
FIG. 4 shows the grammar of PGSL in Backus-Naur form (BNF)

FIG. 4 shows a table 13 of the grammar of PGSL in Backus-Naur form (BNF). In the table 13, the POSIX standard notation for regular expressions is used to describe the terminal symbols NODE IDENTIFIER, STRING and UNSIGNED. A pattern that is specified using PGSL can be optionally labelled, followed by a list of expressions and an optional property list. The list of expressions specifies the constraints that a subgraph must satisfy such that it is considered a solution to the subgraph isomorphism.

A property list is either a single property, or a list of properties separated by commas. A property list could also be empty, which indicates that it is optional.

An expression list is either a single expression, or a list of expressions with an optional label. That label is referred to as sub-pattern label (sp_label). The list of expressions is separated with commas.

An expression is one of the following:

A node that is optionally quantified and labelled with an expression label (e_label);
a block (i.e., an expression enclosed by parentheses) with optional quantification and optional expression label;
a loop (i.e., an expression enclosed by double square brackets) with optional quantification and optional expression label;
an undirected serial outer connection, i.e. an expression, undirected-serially connected to another expression;
a left-to-right serial connection, i.e. an expression, left-to-right-serially connected to another expression;
a right-to-left serial connection, i.e. an expression, right-to-left-serially connected to another expression;
an outer parallel connection, i.e. an expression, connected to another expression in parallel;
an expression label.

A quantifier is one of the following: '#' (even), '~' (odd), '+' (one or more times), '*' (zero or more times).

An inner connector is one of the following: '-' (serial), '>' (left-to-right), '<' (right-to-left), '|' (parallel.)

In order to indicate that a quantification is optional, it could be empty (opt_quantification).

A quantification can be either a zero-or-one quantification ('?'), or multiple occurrences of the preceding inner connector such as follows:

Even, odd, zero or more times, one or more times;
an {n}-quantification;
an {n,}-quantification;
an {n,m}-quantification.

An expression label can be empty, indicating that it is optional, and is specified as a colon ':', followed by a string literal.

A sub-pattern label can be empty, indicating that it is optional, and is specified as a string literal, followed by a colon ':'.

A pattern label can be empty, indicating that it is optional, and is specified as a string literal, followed by an equality sign '='.

A node identifier is a string literal, preceded by a Dollar sign '$' or a backslash '\'.

A literal string is a combination of upper-case and lowercase letters, the underscore sign '_', and digits. A string has at least one character.

An unsigned number is the combination of digits. A number has at least one digit.

Based on the exemplary LFSRs of FIGS. 5a to 5c creating a pattern expressed as a PGSL specification shall be described in the following.

The first challenge when creating a pattern in PGSL is to identify a common feature of the structure of interest. Considering a common class of LFSRs, the common feature of a shift register is identified, whose input bit is the linear combination of some of its output bits using XOR. As already outlined, such a feature is referred to as the structural kernel.

Once the structural kernel is identified, the next challenge is to formulate a PGSL specification for it. This process is illustrated using the LFSR given in FIG. 2b. First the different feedback paths are decomposed such that any node in the feedback path has an indegree and outdegree of one (except the start and end nodes, for sake of clarity). The result of this decomposition is given in FIG. 5a. Each of the feedback paths that result from this decomposition satisfies the PGSL specification given in Expression (1).

$$\$dff\text{->}\$xor\text{>+} \qquad \text{(Expr. 1)}$$

It literally says: "A $dff node is serially connected to one or more serially connected $xor nodes". The quantification '>+' affects the block that precedes the quantification. In this example, the preceding block of the quantification is an $xor node. The quantification consists of the quantifier '+' and a preceding inner connector that specifies how the multiply occurring blocks are connected due to the quantification. In this example, multiple $xor nodes are serially left-to-right-connected, as specified by '>' (and as illustrated in FIG. 5a).

Figure 5A:
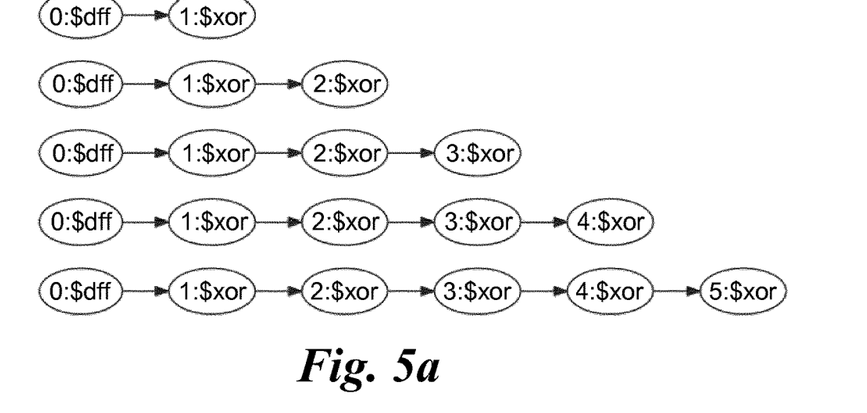
FIGS. 5a to 5c illustrate the creation of a search pattern in PGSL according to FIGS. 3 and 4.
Figure 5B:
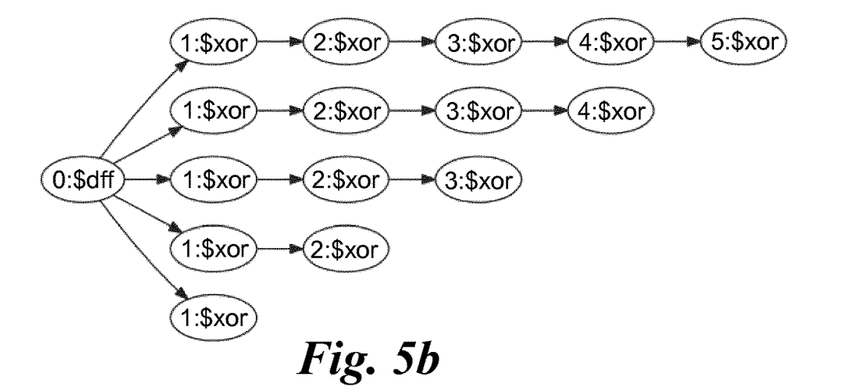
Figure 5C:
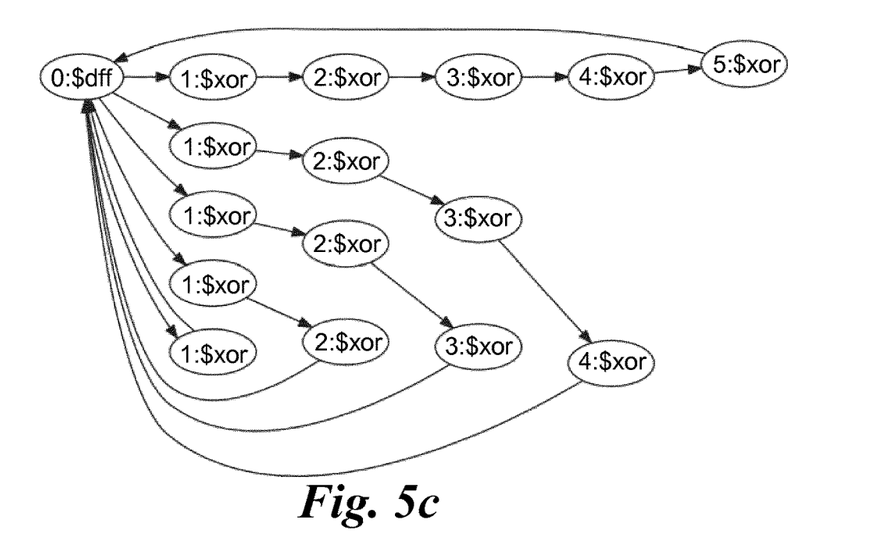

As a next step, the five paths in FIG. 5a are related to each other. In fact, they all are parallel, with the $dff node as branching node and as sink node. Therefore, first the distributive law is applied to the five paths such that the $dff node distributes over the parallel "chains" of $xor nodes. This determines the $dff node as the branching node of a parallel connection. The result of the distribution is given in Expression (2) and is illustrated in FIG. 5b.

$$\$dff\text{->}(\$xor\text{>}+)|+ \quad (\text{Expr. 2})$$

Figures 6A, 6B, 6C, 6D:
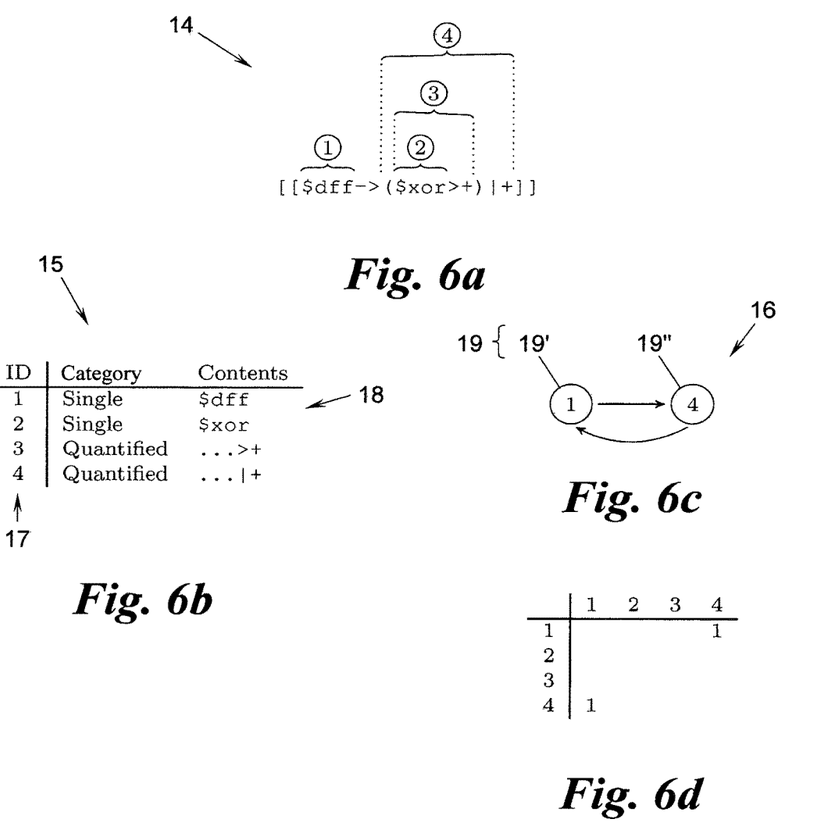
FIGS. 6a to 6f illustrate the search pattern of FIG. 5c being parsed by a parser and lexer process.

To finish the PGSL specification of an LFSR, the $dff node has to be specified as a sink node to the "last" nodes of the $xor chains. Therefore, these nodes are connected back to the $dff using the loop operator. The result of applying the loop operator is given in Expression (3) and illustrated in FIGS. 5c and 6a.

$$[[dff\text{->}(\$xor\text{>}+)|+]] \quad (\text{Expr. 3})$$

In order to find patterns specified with PGSL, a specific search algorithm is applied. A top view thereof can be seen in FIG. 7. This algorithm can be implemented as a pass of the free and open-source synthesis tool Yosys.

As illustrated in FIGS. 6a to 6f, patterns specified using PGSL, like the exemplary pattern 14 of FIG. 6a, first may optionally be processed, interpreted and converted to a form, which represents the pattern unambiguously for further processing. For this purpose, two main structures are created from pattern 14: a pattern node map 15 (FIG. 6b) and a pattern graph 16 (FIG. 6c). The pattern node map 15 stores all the different nodes of the formulated pattern 14 by unique pattern node ID 17 and reference 18. A pattern node 19 can either be a single node 19', which will be mapped to a single node in the target design 3, 10 or be a quantified node 19", which is a combination of connected single and quantified nodes 19', 19" with a chosen quantification. Single nodes 19' stand for themselves, representing a to be found node 4 of a specific type of the target design 3, 10. Quantified nodes 19" also store the contained pattern nodes 19, their inner connections and the quantification.

In general, a pattern specified with PGSL can be seen as a hierarchical structure, which is a combination of connected single nodes 19' and quantified nodes 19". The IDs of top pattern nodes, their adjacency matrix (FIG. 6d) and a list of target design node types that are present in the pattern ("needed types") are stored in the pattern graph 16. To create the pattern graph 16 and pattern node map 15 from PGSL patterns 14, a parser and lexer combination 20 (FIG. 7) can optionally be implemented, e.g. using the lexical analyser generator Flex and the parser generator GNU Bison.

Figure 6E:
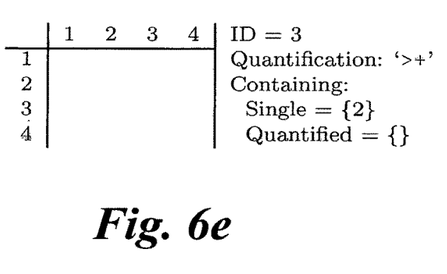
Figure 6F:
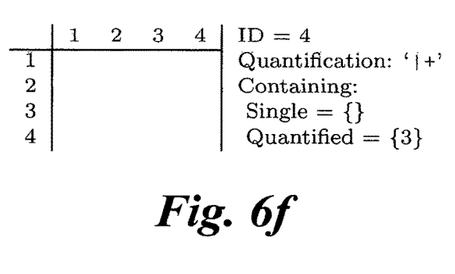
Figure 7:
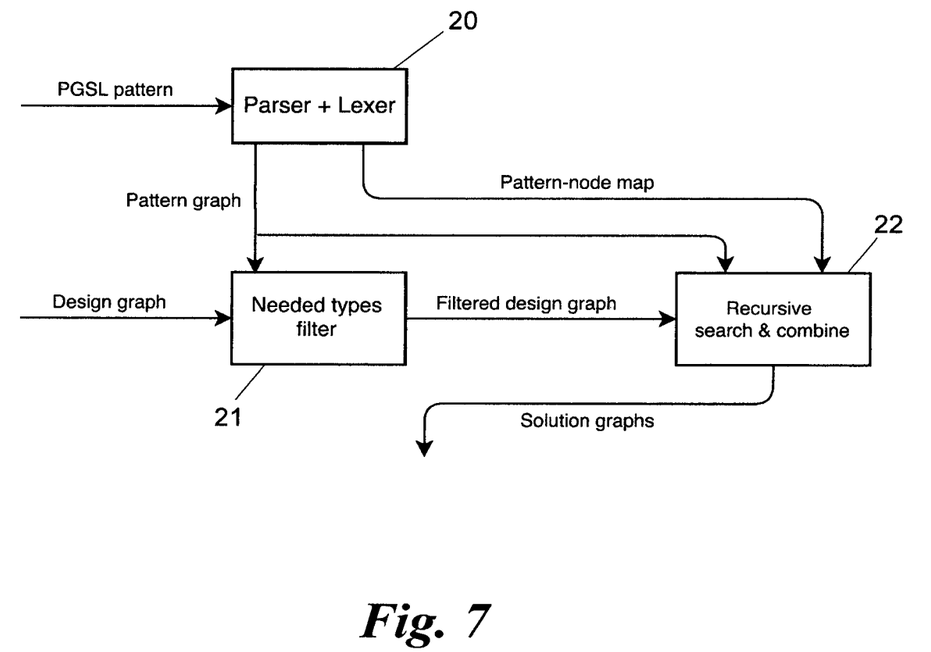
FIG. 7 shows a method for automatic detection of a functional primitive according to the disclosed subject matter in a functional overview.

FIGS. 6a to 6f illustrate the function principle of the parser and lexer process of the proposed search algorithm, examined on the PGSL specification of the example listing 14 in FIG. 6a. The PGSL specification is parsed and four pattern nodes are identified (two single nodes and two quantified pattern nodes), see FIG. 6a. The result is stored in the pattern node map 15 of FIG. 6b, FIG. 6c showing the related top-level pattern graph 16, whose connectivity is stored in an adjacency matrix shown in FIG. 6d. For each quantified pattern node, a data structure is created that stores the ID of the quantified pattern node, its quantification, the sets of single nodes and quantified nodes that are part of the quantified pattern node, as well as the adjacency matrix that specifies how these single nodes and quantified nodes are connected. A quantified pattern node is a subgraph of the pattern graph. FIG. 6e shows the quantified pattern node with ID=3, and FIG. 6f shows the quantified pattern node with ID=4.

After the pattern has been analyzed an optional search preprocessing step 21 filters the target design to reduce the search space. At this stage the target design is represented by the design graph. Filtering is done by comparing the target design nodes to the needed types stored in the pattern graph and removing nodes of types, which can not be candidates for any pattern node ("unneeded types") from the graphs representing the target design.

Finally the search is carried out, e.g. using a recursive search & combine procedure 22. If any solutions are found they are returned as subgraphs of the target design, which are referred to as solution graphs.

Figure 8:
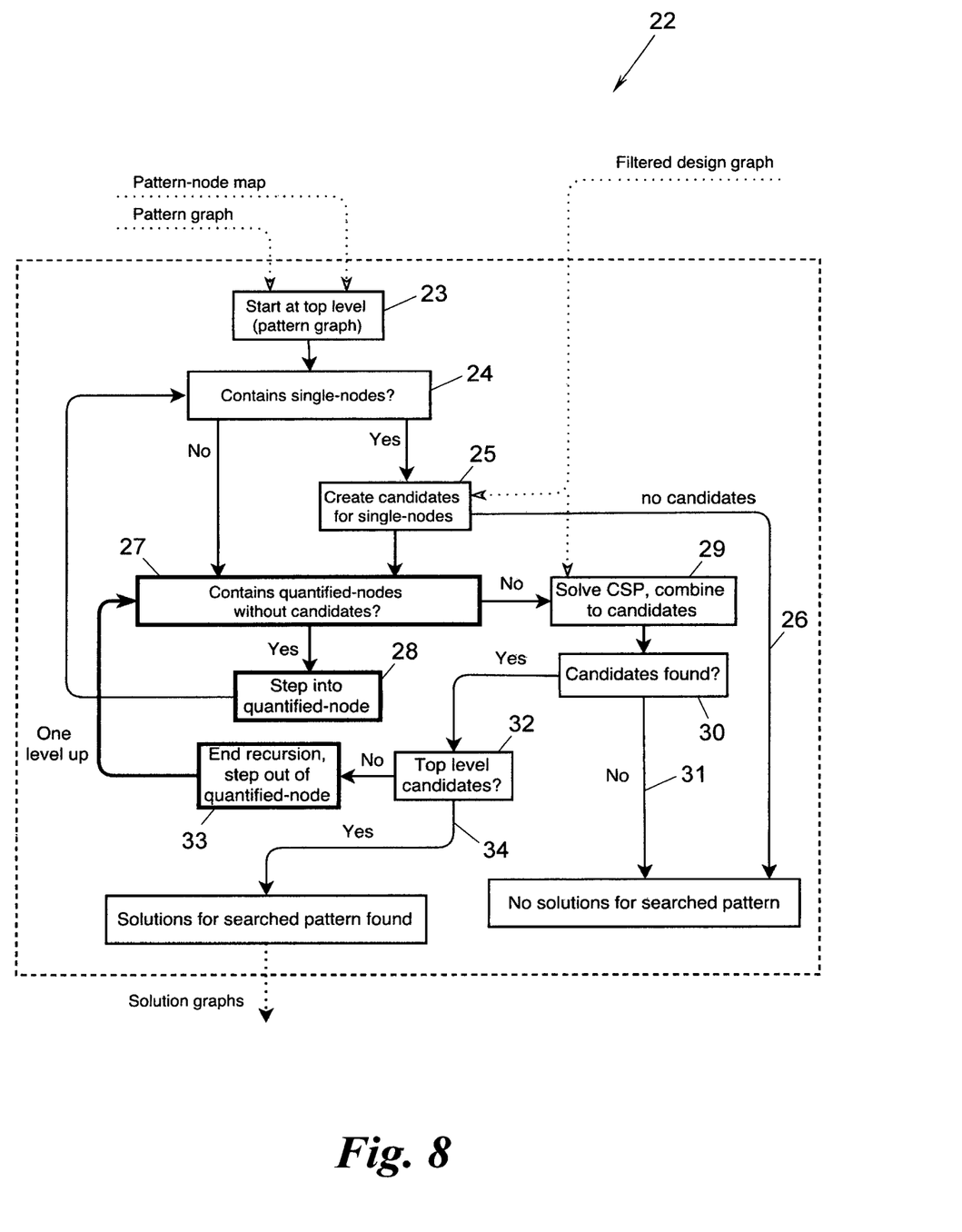
FIG. 8 shows a recursive search and combine procedure of the method of FIG. 7 in a flow diagram.

A flowchart of this recursive search & combine procedure 22 is depicted in FIG. 8.

Due to the hierarchical form of PGSL patterns, every level can be seen as a sub-pattern. The recursive search & combine procedure 22 starts at the top level of the pattern hierarchy (step 23). First it is checked if candidates for the pattern nodes at the current level can be created. If any single nodes are present (step 24), candidates for these single nodes are created (step 25). Every node in the target design that matches the type of the single node could be taken as a candidate for the single node under examination. On large target designs this may lead to many candidates. Therefore the types of adjacent pattern nodes are optionally considered when selecting candidates. Only a node in the target design whose adjacent types match the adjacent types of the single node is chosen as a candidate. If no candidate can be found for a single node the whole pattern can not be found and the algorithm aborts (path 26).

In a step 27, it is checked whether quantified nodes are present. For quantified nodes it is not possible to find candidates directly. Quantified nodes have to be further examined, as they form a new level in the hierarchy of the pattern. This is done by stepping into quantified nodes (step 28). This mechanism leads to recursion.

Once a lowest level is reached, signalled by no more quantified nodes the optional CSP solver comes into play for the first time (step 29). Each pattern node can be seen as a vertex of a constraint satisfaction problem with the domain being its candidates. Connections between pattern nodes are stored in an adjacency matrix. These connections can be used as constraints for the constraint satisfaction problem. A solution of the constraint satisfaction problem assigns each pattern node one candidate while satisfying all constraints given by the sub-pattern in the target design graph. These found combinations combined with connections as defined by the constraints form subgraphs of the target design which are in turn candidates for the sub-pattern under examination. If at any time no solution for a sub-pattern can be found in a step 30 the whole pattern cannot be found and the whole algorithm aborts (path 31).

Following the described steps the algorithm solves sub-patterns and combines them to candidates for higher level sub-patterns. When a sub-pattern is solved, and therefore is no longer without candidates which also examined in step 27, the recursion has to be ended, which is equivalent to stepping out of the quantified node and continuing at a level above (see steps 32 and 33). Finally if the solved level is the top level which is checked in step 32, solutions for the whole pattern are found and the algorithm terminates (path 34).

The disclosed subject matter is not limited to the optional embodiments described in detail above but comprises all variants, modifications and combinations thereof which fall into the scope of the appended claims.

The invention claimed is:

1. A computer-implemented method for automatic detection of a functional primitive in a model of a hardware system, the model being a netlist at register transfer level, the netlist being a specification of electronic components and connections between the electronic components, the netlist having cells and data flow net links between cells and being bipartite, the method comprising the following steps:
   a) mapping the cells to target nodes of a target graph and the data flow net links to edges of the target graph which target graph is monopartite and each target node of which has a target node type, the edges representing data flow net links between the cells, and
   mapping the functional primitive to a hierarchical search pattern having at least two levels of search nodes and connections therebetween, wherein each search node is one of a single node and a container node, wherein the single node has a search node type, and wherein the container node contains at least one further search node of a lower level, a multiplier indicating a multiplicity of said at least one further search node, and a connection type indicating a type of the connections between the search nodes of said multiplicity;
   b) selecting candidates from those target nodes the target node types of which match a search node type, and
   selecting a candidate structure from those selected candidates the target nodes and edges of which match the search nodes and connections of the hierarchical search pattern;
   c) reverse-mapping the target nodes and edges of the selected candidate structure to the cells and data flow net links of the netlist; and
   d) outputting said cells and data flow net links as detected functional primitive; and
   wherein step b) comprises:
   b1) starting at the highest level of the hierarchical search pattern and setting said highest level as present level;
   b2) determining whether the hierarchical search pattern of the present level contains at least one single node, and if so, performing said selecting of candidates from those target nodes the target node types of which match a search node type of said at least one single node;
   b3) determining whether the hierarchical search pattern of the present level contains at least one container node and no candidate has been selected for single nodes contained in said container node and, if so, proceeding to step b4), otherwise, performing said selecting of a candidate structure from those selected candidates the target nodes and edges of which match the search nodes of the present level and their connections, and proceeding to step b5);
   b4) setting the present level a level lower and returning to step b2);
   b5) determining whether the present level is not the highest level, and if so, setting the present level a level higher and proceeding to step b3), otherwise, proceeding to step c).

2. The method of claim 1, wherein prior to step b2) the target graph is filtered by masking out those target nodes the target node type of which does not match the search node type of any search node.

3. The method of claim 1, wherein, for selecting candidates and a candidate structure, the hierarchical search pattern is parsed into a search node map and a search graph, the search node map containing a unique search node identifier for each of the search nodes, the respective search node type for each single node, and both the respective connection type and multiplier for each container node, and the search graph containing the respective search node identifiers of the search nodes of each level and their mutual adjacencies of the search nodes.

4. The method of claim 1, wherein said selecting of candidates further comprises that the target node types of adjacent target nodes have to match search node types of adjacent search nodes.

5. The method of claim 1, wherein said selecting of a candidate structure comprises solving a constraint satisfaction problem the constraints of which include the connection types of the search nodes, and wherein the candidate structure is selected from those candidates, the edges of which satisfy the constraints.

* * * * *